United States Patent
Reeves et al.

(10) Patent No.: US 9,893,955 B2
(45) Date of Patent: Feb. 13, 2018

(54) METHODS, SYSTEMS AND COMPUTER PROGRAM PRODUCTS FOR IDENTITY AND ACCESS MANAGEMENT

(75) Inventors: Allison Reeves, Dallas, TX (US); Michael Johnson, Gresham, OR (US); Michael Kirkpatrick, Marietta, GA (US); Gary Toretti, Flower Mound, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1408 days.

(21) Appl. No.: 12/649,505

(22) Filed: Dec. 30, 2009

(65) Prior Publication Data
US 2011/0162047 A1    Jun. 30, 2011

(51) Int. Cl.
| G06F 7/04 | (2006.01) |
| H04L 12/24 | (2006.01) |
| G06F 21/33 | (2013.01) |
| G06F 21/60 | (2013.01) |
| G06Q 10/10 | (2012.01) |
| H04L 29/06 | (2006.01) |

(52) U.S. Cl.
CPC ............. *H04L 41/28* (2013.01); *G06F 21/33* (2013.01); *G06F 21/604* (2013.01); *G06Q 10/10* (2013.01); *H04L 63/102* (2013.01); *G06F 2221/2101* (2013.01)

(58) Field of Classification Search
CPC ....... H04L 63/102; H04L 63/10; H04W 12/06
USPC .................................. 726/2–6; 713/182–186
See application file for complete search history.

(56) References Cited

U.S. PATENT DOCUMENTS

| 2002/0133459 | A1* | 9/2002 | Polk et al. ...................... 705/40 |
| 2002/0178138 | A1* | 11/2002 | Ender ............... G06F 17/30575 |
| 2005/0125509 | A1* | 6/2005 | Ramachandran ......... G06F 8/61 709/220 |
| 2005/0239447 | A1* | 10/2005 | Holzman et al. .......... 455/414.3 |
| 2008/0133373 | A1* | 6/2008 | Perdomo et al. ............... 705/18 |
| 2009/0164517 | A1* | 6/2009 | Shields et al. ............. 707/104.1 |
| 2009/0199280 | A1* | 8/2009 | Muto ................................ 726/6 |
| 2009/0319312 | A1* | 12/2009 | Moerdler et al. ................. 705/7 |

(Continued)

OTHER PUBLICATIONS

Encode Security Infrastructure, Applicant Admitted Prior Art, Printed from the Internet, 2 pages.

(Continued)

*Primary Examiner* — Kambiz Zand
*Assistant Examiner* — Suman Debnath
(74) *Attorney, Agent, or Firm* — Scott P. Zimmerman, PLLC (57) ABSTRACT

Methods of managing access to systems of an organization are provided. The methods include creating a unique identifier for a user, the unique identifier having an associated user profile for the user and being stored with the associated user profile in an identifier repository associated with the organization; requesting at least one account for the user on at least one system of the organization responsive to the creation of the unique identifier for the user, wherein the at least one account is defined based on the user profile of the user associated with the unique identifier; and generating the at least one account for the user on the at least one system of the organization responsive to the request. Related systems and computer program products are also provided herein.

16 Claims, 7 Drawing Sheets

(56) References Cited

U.S. PATENT DOCUMENTS

2010/0005520 A1* 1/2010 Abbot et al. .................. 726/6
2010/0257005 A1* 10/2010 Phenner et al. ............... 705/7
2011/0055673 A1* 3/2011 Teng et al. .................. 715/200

OTHER PUBLICATIONS

IBM Tivoli Access Manager for e-business, Applicant Admitted Prior Art, Printed from the Internet, 3 pages.

* cited by examiner

METHODS, SYSTEMS AND COMPUTER PROGRAM PRODUCTS FOR IDENTITY AND ACCESS MANAGEMENT

BACKGROUND OF THE INVENTION

The present application relates generally to access management, and, more particularly, to methods, systems, and computer program products for managing access to systems of an associated organization.

Most modern organizations have distributed networks that include a multitude of applications, for example, billing applications, to which members of these organizations may or may not have access. These organizations all need rules that define which applications the members have access to and systems to only allow access to the applications to which the members are entitled. Many systems for identity and access management exist, but improved systems are needed.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Some embodiments provide methods of managing access to systems of an organization. The methods include creating a unique identifier for a user, the unique identifier having an associated user profile for the user and being stored with the associated user profile in an identifier repository associated with the organization; requesting at least one account for the user on at least one system of the organization responsive to the creation of the unique identifier for the user, wherein the at least one account is defined based on the user profile of the user associated with the unique identifier; and generating the at least one account for the user on the at least one system of the organization responsive to the request.

In further embodiments, the methods may further include detecting a change in the user profile; and adding and/or removing access to at least one account on the at least one system of the organization responsive to the detected change the user profile.

In still further embodiments, detecting a change in the user profile may be detecting termination of the user. In these embodiments, the method may further include deleting the at least one account of the user on the at least one system responsive to the detected termination; and removing the unique identifier associated with the user from the identifier repository.

In some embodiments, requesting, generating, detecting, adding and/or removing, deleting and/or removing may be performed automatically without user intervention.

In further embodiments, the methods may further include receiving a request to change and/or reset a password associated with a selected one of the at least one account for the at least one system; and changing and/or resetting the password associated with the selected one.

In still further embodiments, generating may be followed by providing account information associated with the at least one account to the user so as to allow the user to access the at least one system associated with the at least one account.

In some embodiments, storing the unique identifier in the identifier repository may further include storing unique identifiers for all users of the systems of the organization in the identifier repository.

Although embodiments are discussed above primarily with respect to method embodiments, system and computer program product embodiments are also provided herein.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another.

Exemplary embodiments are described below with reference to block diagrams and/or flowchart illustrations of methods, apparatus (systems and/or devices) and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.). Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Some embodiments provide methods, systems and computer program products for identity and access management within a system of an organization. In particular, some embodiments provide a web-based application (MyLogins) for providing end users a centralized method for requesting the creation, modification, deletion, or password reset for a wide array of personal system accounts. Embodiments discussed herein are capable of handling a substantially large number of requests. In conventional systems, these requests may be routed to various teams and subsequently distributed to individuals for user account provisioning. According to embodiments discussed herein, the handling of these thousands of requests may be substantially automated as will be discussed below with respect to FIGS. 1 through 8.

As will be discussed herein, an account generation module, for example, TinyTim of AT&T, is an automated system that interfaces with an account requestor module web site, for example, MyLogins of AT&T, and the billing systems requested therein. The account generation module is configured to automate the provisioning of accounts as requested via the account requestor module. The account generation module in accordance with some embodiments is fully scalable, can be spread amongst more than one server, if necessary, to provision as many systems as necessary. Accordingly, some embodiments discussed herein, may provide a centralized automation system that may save the organization money and reduce costs.

Figure 1:
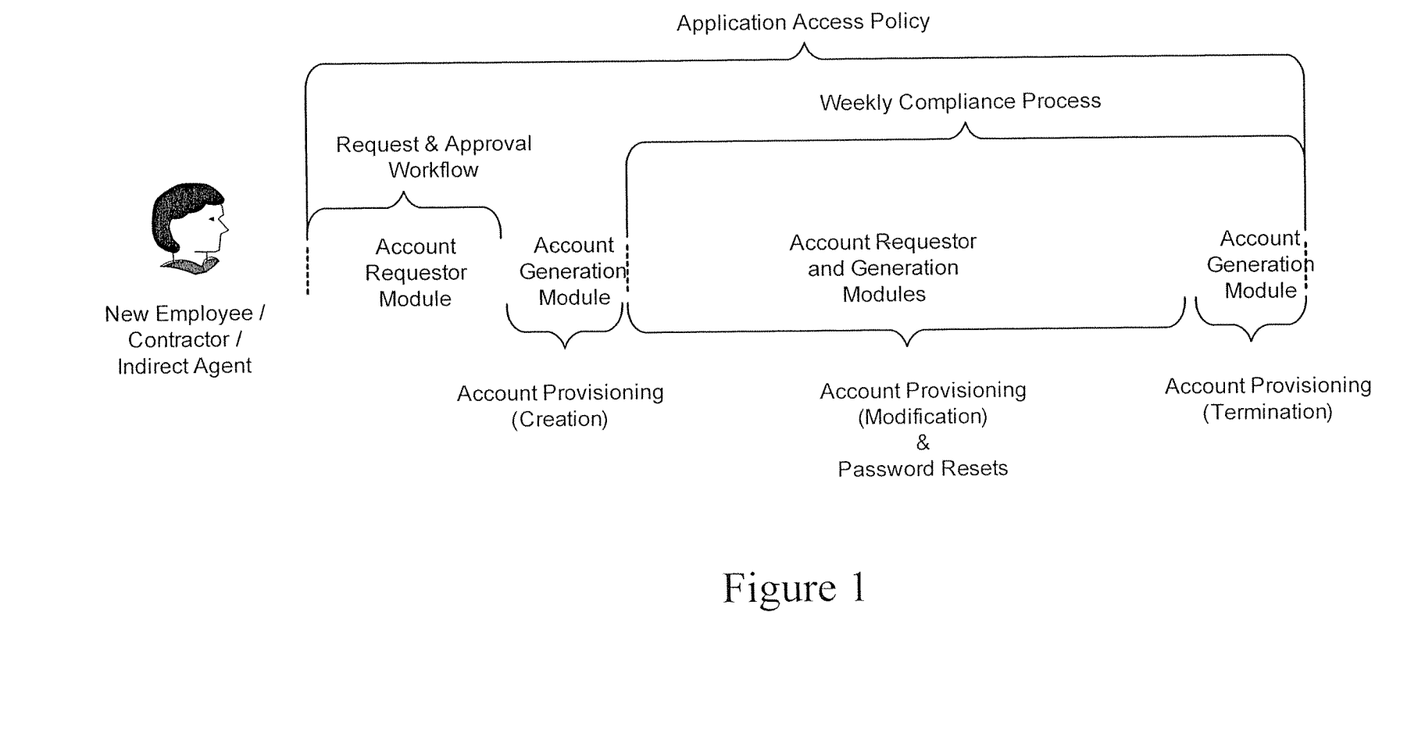
FIGS. 1 and 2 are block diagrams illustrating a system for access management in accordance with some embodiments.

Referring to FIG. 1, a diagram illustrating flow of an identity and access management system in accordance with some embodiments will be discussed. As illustrated in FIG. 1, the identity and access management system discussed herein is configured to handle all stages of the user account, creation of the account, modification of the account and/or passwords, and termination of the account. The identifier creation module, the account requestor module and the account generation module together are configured to provide an end to end, i.e., from creation to termination, access management system.

According to some embodiments, the account generation module (TinyTim) interfaces with many systems, any system capable of benefiting from an automation process, for example, ticketing systems or billing systems. In particular, the account requestor module (MyLogins) is configured to submit requests (or tickets) for employees to request access to systems of the organization, for example, billing systems. The account requestor module is also configured to interface with many billing systems. Each system serves as the target for each ticket provisioned. A billing system may be accessed by, for example, structured query language (SQL), Web graphical user interface (GUI), or the combination of both.

In existing systems, the account management team (AMT) uses this system to create or modify accounts, and after completing the account provisioning, the requests are marked completed with the username, password, and status message for each user. According to some embodiments of the present invention, the account generation module may be configured to automatically provision systems, thus doing away with the need to involve a human, for example, AMT. Thus, embodiments discussed herein may provide rapid application development and a flexible, scalable system as will be discussed further herein.

Figure 2:
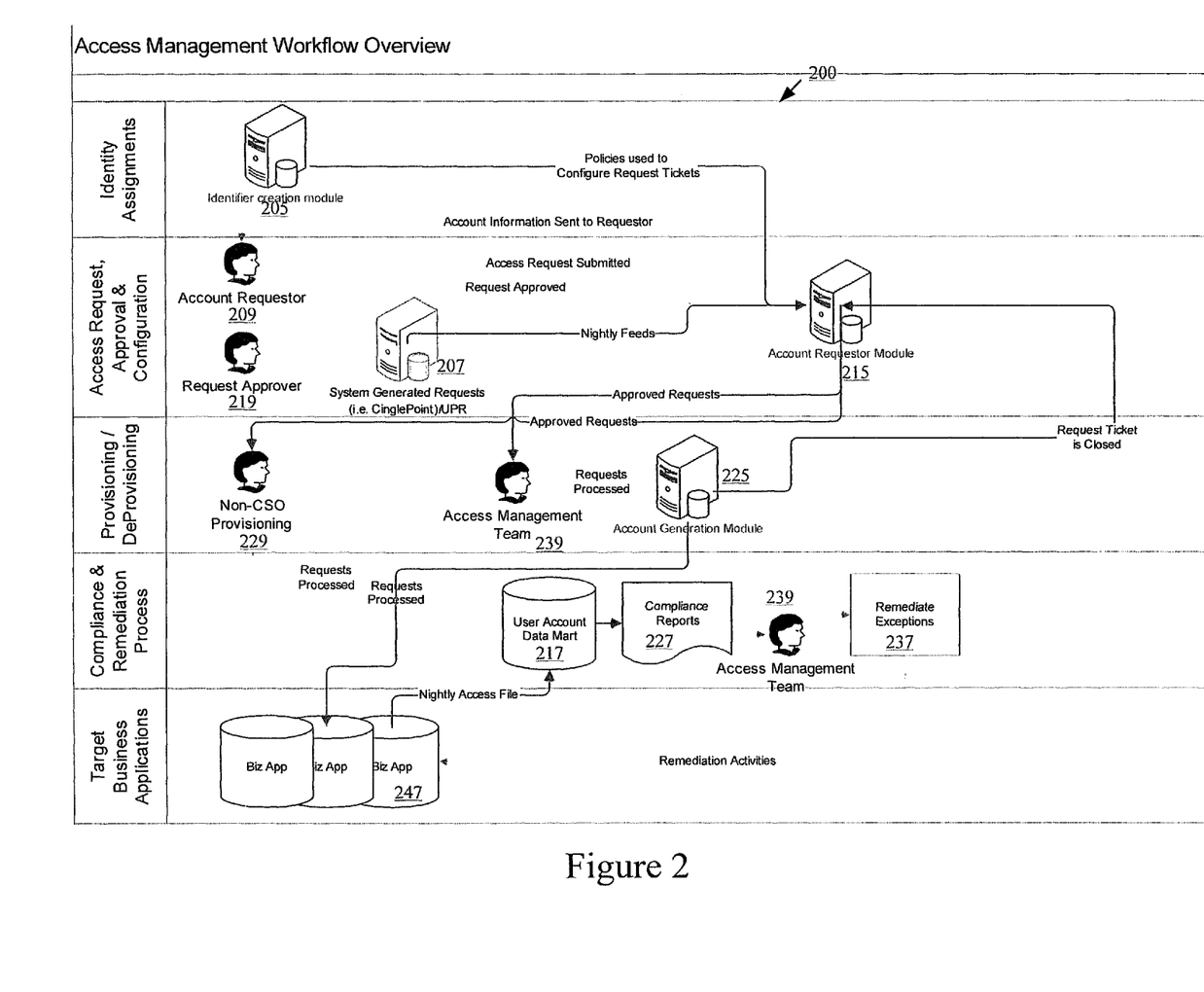

Referring now to FIG. 2, a diagram illustrating modules and applications in a system 200 in accordance with access management systems in accordance with some embodiments will be discussed. As illustrated in FIG. 2, the system includes an identifier creation module 205, for example, security user ID tracking system (SUITS) of AT&T, an account requestor module 215, for example, MyLogins, an account generation module 225, for example, TinyTim, a system generated requests server/user privilege review (UPR) Server 207, a user account data mart 217, a compliance report database 227, a remediate exceptions database 237, various business applications 247, and various humans, such as account requestors 209, request approvers 219, Non-CSO provisioning 229, and AMT 239.

As discussed above, the account generation module 225 is provided to automate processes that would traditionally be handled by a human being. Although humans are provided in the system 200 of FIG. 2, humans are not necessarily present in the system. In other words, the system can be completely automated without departing from the scope of embodiments discussed herein. Thus, it will be understood that in some embodiments a combination of automation and human beings may be used without departing from the scope of embodiments discussed herein. For example, users, for example, employees can create their requests; AMT can focus on manually provisioning systems that have not been automated; and the provisioning process may be streamlined for those systems supported by the account generation module. The combination of humans and automation may provide rapid application development as well as flexibility and scalability.

It will be understood that the account generation module 225 discussed herein in accordance with some embodiments may be a background process invisible to users, who submit all requests through the account requestor module 215 web site. The various types of users who will inherently and unknowingly use the account generation module 225 by submitting a request, for example, add, change, password reset, delete, and/or separated, are employees, such as new hires, existing employees, terminated employees or their managers and the like.

For example, a manager of the new hire may submit a request to create the new hire the appropriate account in the requested systems. An existing employee may submit a request to modify an existing account, add a new account, or even remove his/her account to/from the requested system. He/she may also submit a password reset request to a specified system. Finally, a manager of a terminated employee or human resources may submit a request to remove his/her access to all systems. All of these requests may be handled in accordance with embodiments discussed herein.

Various requests in accordance with some embodiments of the present invention will now be discussed with respect to FIG. 2. When the organization hires a new employee, the identifier creation module 205 (SUITS) is configured to give the new employee a unique identifier and an associated profile is created for the new employee. The profile of the new employee identifies which applications the new employee needs access to, for example, the organization/department in which the new employee works defines the applications the new employee needs access to. In some embodiments, the new hire or an existing employee needs a new account added to a specified system. In these embodiments, the user connects to the account requestor module 215 web site and selects a "Login Request Form" from the home page. The user selects the "Organization" and "Department" in which the user works. The user selects add for the "Request Type" and enters the user's unique identifier. The user selects "Profile" and any other additional profile attributes if prompted and submits the request. It will be understood that the user must have access to the account requestor module 215 web site to add a new account.

An existing employee may need an existing account updated in a specified system. In these embodiments, the user connects to the account requestor module 215 web site and selects a "Login Request Form" from the home page. The user selects the "Organization" and "Department" in which the user works. The user selects CHANGE for the "Request Type" and enters the user's unique identifier. The user selects the user "Profile" and any other additional profile attributes if prompted and submits the request. It will be understood that the user must have access to the account requestor module 215 web site and an existing account in the target system in which the update will occur. If no account exists, the request is returned.

In some embodiments, an existing employee no longer needs access to a specified system. In these embodiments, a superior, for example, the user's manager will connect to the account requestor module 215 web site and selects a "Login Request Form" from the home page. The user selects the "Organization" and "Department" in which the user works. The user selects DELETE or SEPARATED for the "Request Type" and enters the user's unique identifier and submits the request. The user must have access to the account requestor 215 web site, and an existing account in the target system in which the removal will occur. If no account exists, the request is completed.

In some embodiments, the employee may no longer be employed by the organization, for example, he/she may be terminated. In this embodiment, the access management system may auto-generate tickets to remove the accounts associated with the employees unique identifier.

In some embodiments, an existing employee needs his/her password for an existing account reset in a specified system. In these embodiments, the user connects to the account requestor module 215 web site and selects a "Password Reset" from the home page. The user selects the desired system for which the password reset will occur and submits the request. The user must have access to the account requestor module 215 web site, and an existing account in the target system in which the update will occur. If no account exists, the request is returned.

As discussed above, the account generation module 225 is invisible to end users as it is integrated with the account requestor module 215 web site. The account generation module 225 is configured to connect to the account requestor module 215 web site via the COM/DOM library, which provides full access to the embedded HTML. The account generation module also connects to databases via the OracleClient library. Depending on how the billing system is provisioned, dictates how the account generation module will access the data source; it will either utilize COM/DOM, OracleClient, or a combination of both.

In some embodiments, incoming data is fetched from the HTML within the Request. This data is used to provision the user account. After provisioning is complete, the outgoing data is in the form of a status message, for example, "User created successfully," which is passed to the Request for each user.

It will be understood that the account generation module can access virtually any interface supported by the .NET framework. In some embodiments, it can be divided amongst many servers to increase provisioning time if/when necessary.

Account termination, i.e. when an employee leaves the company or is terminated, may be automated by a process feed daily by the system 205 (SUITS). When an account is terminated all accounts created for the particular unique identifier are terminated regardless of the format of the account. Furthermore, sponsored accounts may begin a process to assign to a new sponsor.

Furthermore, some embodiments may aid in the compliance process. As illustrated in FIG. 2, compliance reports 227 may be run peridocally, for example, weekly, and exceptions may be remediated 237. The compliance process in accordance with some embodiments supports Sarbanes Oxley (SOX)/Security standards and may meet ASPR guidelines.

Referring again to FIG. 2, the system generated requests server/UPR server 207 is illustrated as a single server if FIG. 2, however, embodiments of the present invention are not limited to this configuration. For example, these functionalities may be provided by a system generated requests server and a separate UPR server without departing from the scope of embodiments discussed herein. It will be understood that the functionality of the system generated requests server/UPR server 207 may also be distributed amongst more than 2 servers without departing from the scope of embodiments discussed herein.

The system generated requests portion of server 207 is configured to allow external systems, such as CinglePoint, to feed data to the account requestor module 215 each night (nightly feeds). The account requestor module 215 is then configured to turn these nightly feeds into ADD requests and then processes these ADD requests through normal workflows, for example, the account generation module 225, humans or a combination of the two.

The UPR portion of server 207 is configured to force ad hoc access reviews of users that have access to the system 200. The UPR server 207 reviews nightly feed from the identifier creation module 205 (SUITS). If it is determined that key (important) data has changed, for example, a job code or supervisor's unique identifier (AT&T UID), then UPR server 207 is configured to initiate an access review by the employee's current manager. An access review may require that the manager log into the UPR server and review the access their employee has as documented in the access requestor module (MyLogins). At this point, the manager can assert that the access by his/her employee is correct, have access by the employee removed or have access by the employee changed through the UPR server 207 interface. Once the manager takes one of these actions, the UPR sever 207 sends associated tickets to the access requestor module 215 (MyLogins), which are processed through normal workflows, for example, the account generation module 225, humans or a combination of the two.

Figure 3:
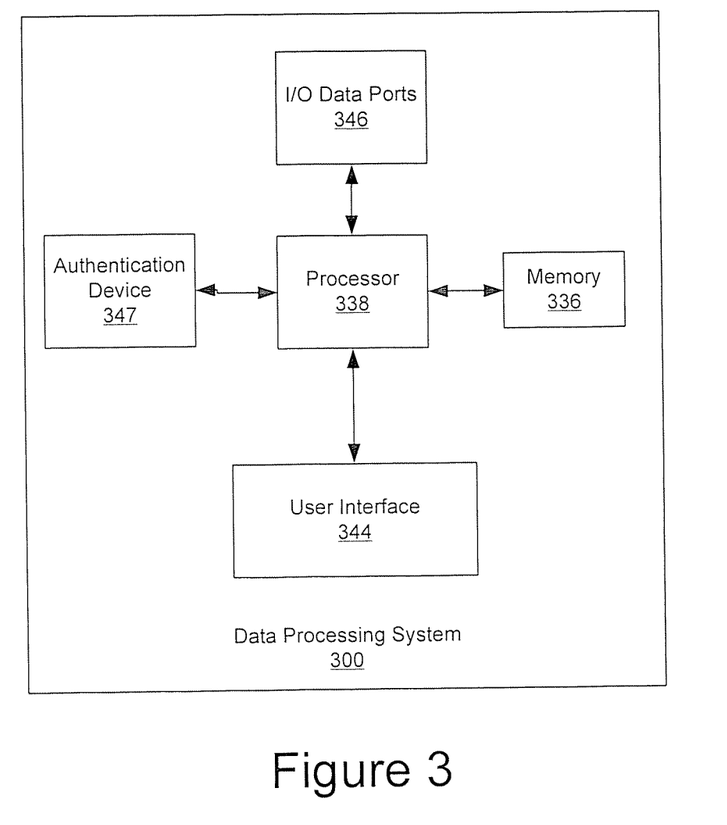
FIG. 3 is a block diagram of a data processing system suitable for use in some embodiments.

Referring now to FIG. 3, a data processing system 300 in accordance with some embodiments will be discussed. The data processing system 300 may be used by the access management system in accordance with some embodiments. As illustrated in FIG. 3, the data processing system 300 may include a user interface 344, including, for example, input device(s) such as a keyboard or keypad, a display, a speaker and/or microphone, a memory 336 and an authentication device 347 that communicate with a processor 338. As discussed above, the authentication device 347 may be configured to provide data associated with one or more authenticators, for example, voice and/or fingerprint biometrics, in accordance with embodiments discussed herein. The data processing system 300 may further include I/O data port(s) 346 that also communicates with the processor 338. The I/O data ports 346 can be used to transfer information between the data processing system 300 and another computer system or a network, such as the Internet, using, for example, an Internet Protocol (IP) connection. These components may be conventional components such as those used in many conventional data processing systems, which may be configured to operate as described herein.

Figure 4:
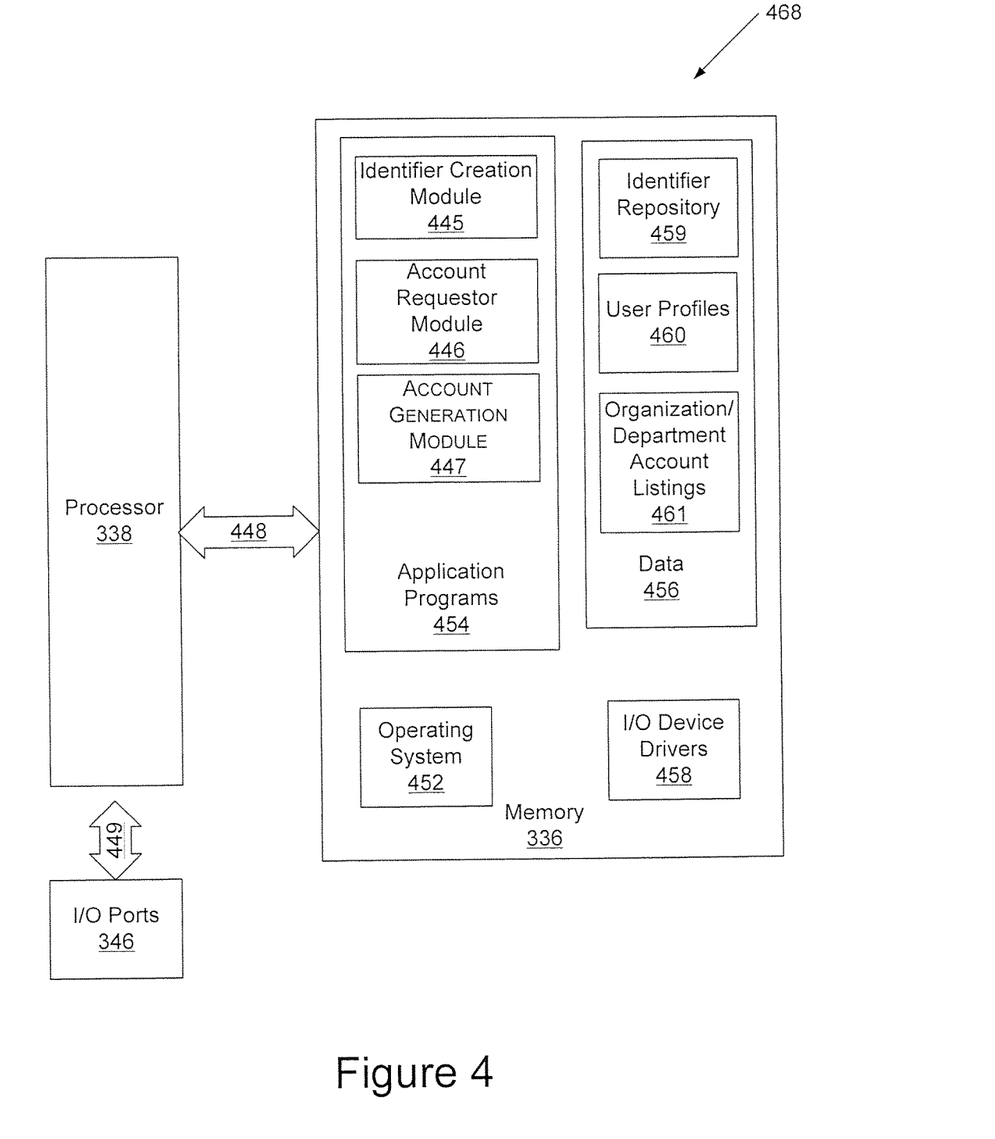
FIG. 4 is a more detailed block diagram of a system according to some embodiments.

Referring now to FIG. 4, a more detailed block diagram of a data processing system 468 for implementing systems, methods, and computer program products in accordance with some embodiments will now be discussed. It will be understood that the application programs and data discussed with respect to FIG. 4 below may be present in, for example, an access management system in accordance with some embodiments without departing from the scope of embodiments discussed herein.

As illustrated in FIG. 4, the processor 338 communicates with the memory 336 via an address/data bus 448 and with I/O port 346 via address/data bus 449. The processor 338 can be any commercially available or custom enterprise, application, personal, pervasive and/or embedded microprocessor, microcontroller, digital signal processor or the like. The memory 336 may include any memory device containing the software and data used to implement the functionality of the data processing system 300. The memory 336 can include, but is not limited to, the following types of devices: ROM, PROM, EPROM, EEPROM, flash memory, SRAM, and DRAM.

As further illustrated in FIG. 4, the memory 336 may include several categories of software and data used in the system 468: an operating system 452; application programs 454; input/output (I/O) device drivers 458; and data 456. As will be appreciated by those of skill in the art, the operating system 452 may be any operating system suitable for use with a data processing system, such as OS/2, AIX or zOS from International Business Machines Corporation, Armonk, N.Y., Windows95, Windows98, Windows2000 or WindowsXP, Windows Vista, Windows7 or Windows CE from Microsoft Corporation, Redmond, Wash., Palm OS, Symbian OS, Cisco IOS, VxWorks, Unix or Linux. The I/O device drivers 458 typically include software routines accessed through the operating system 452 by the application programs 454 to communicate with devices such as the I/O data port(s) 346 and certain memory 336 components. The application programs 454 are illustrative of the programs that implement the various features of the system 468 and may include at least one application that supports operations according to embodiments. Finally, as illustrated, the data 456 may include an identifier repository 459, user profiles 460, and organization/department account listings which may represent the static and dynamic data used by the application programs 454, the operating system 452, the I/O device drivers 458, and other software programs that may reside in the memory 336.

As further illustrated in FIG. 4, according to some embodiments, the application programs 454 include an identifier creation module 445, an account requestor module 456 and an account generation module 447. While the present invention is illustrated with reference to the identifier creation module 445, the account requestor module 456 and the account generation module 447 being application programs in FIG. 4, as will be appreciated by those of skill in the art, other configurations fall within the scope of embodiments discussed herein. For example, rather than being application programs 454, these circuits or modules may also be incorporated into the operating system 452 or other such logical division of the system 468. Furthermore, while the identifier creation module 445, the account requestor module 456 and the account generation module 447 is illustrated in a single system 468, as will be appreciated by those of skill in the art, such functionality may be distributed across one or more systems. Thus, the embodiments discussed herein should not be construed as limited to the configuration illustrated in FIG. 4 but may be provided by other arrangements and/or divisions of functions between data accessing systems. For example, although FIG. 4 is illustrated as having multiple modules 445, 446 and 447, these modules may be combined or more than three of these circuits/modules may be provided without departing from the scope of embodiments discussed herein.

The identifier creation module 445 may be configured to create a unique identifier for a new user. This identifier creation module 445 may be provided by SUITs of AT&T in some embodiments. In these embodiments, the identifier may be the AT&T UID. The unique identifier has an associated user profile 460 for the user, which may include the users name and address, the department and organization in which the new user will work, for example, accounting or research and development, and other information relevant to the user and/or the user's employment in the organization. The unique identifier may be stored in an identifier repository 459 associated with the organization. This identifier repository 459 may be a single repository or multiple repositories without departing from the scope of embodiments discussed herein. In some embodiments, the identifier repository stores all of the identifiers for every user in the organization.

The account requestor module 446 is configured to request one or more accounts for the user on one or more systems of the organization responsive to the creation of the unique identifier for the user. The one or more accounts to be created for the user may be defined based on information found in the user profile 460 of the user associated with the unique identifier. For example, if the user's profile indicates that the user will be in accounting, certain accounts will be created for the user based on the needs of employees working in accounting. These accounts may be defined by the organization/department 461 of the user. If, on the other hand, the user profile indicated that user is the new CEO of the organization, certain accounts will be created for the CEO. It will be understood that not all users have access to all accounts and only have access to those accounts necessary to accomplish their daily tasks. Furthermore, each user may have a different "security clearance." The higher the security clearance, the more accounts the user may have. For example, the CEO will have a higher security clearance than the accountant. It will be further understood that the accounts to which users are given access when they join the organization may be changed. In other words, the user may be given access to new accounts, access to accounts may be taken away, or both as will be discussed further below.

The account generation module 447 is configured to generate the one or more accounts for the user on the one or more systems responsive to the requests. As discussed above, if the system detects a change in the user profile, for example, the user is promoted or demoted, the account generation module 447 may be further configured to add and/or remove access to one or more accounts on one or more systems of the organization responsive to the detected change in the user profile. If the user is promoted, the user may need access to additional accounts and may no longer need access to accounts he/she originally had access to. This change may be detected by the UPR server 207 when processing nightly feeds as discussed above with respect to FIG. 2.

In some embodiments, the detected change in the user profile may be termination of the user as an employee of the organization. When termination is detected, the one or more accounts of the user on the systems of the organization may be deleted responsive to the detected termination. As discussed above, all accounts associated with the unique identifier of the user will be deleted and the unique identifier may be deleted from the identifier repository 459.

As discussed above, the operations of the account requestor module 446 and the account generation module 447 may be fully automated, i.e. operate without human intervention, or may be partially automated, i.e. operate with some human intervention without departing from the scope of embodiments discussed herein.

In some embodiments, the requestor module 446 may be further configured to receive a request to change and/or reset a password associated with a selected one of the accounts associated with a user. The account generation module 447 may be configured to change and/or reset the password associated with the selected accounts responsive to the request. As discussed above, passwords are only changed and/or reset when authentication of the user can be obtained. These resets may be preformed in real-time in some embodiments.

Once the accounts are created, the user associated with the unique identifier associated with the accounts may be provided with the account information associated with the accounts so as to allow the user to access the systems associated with the accounts. The information provided may be a username and password for each account. As discussed above, the user may change the password provided by the access management system to something user may more easily remember.

Thus embodiments discussed herein provide an identity and access management system configured to handle all aspects of account management from adding a new employee to the identifier repository and creating the necessary accounts and handling changes to these accounts and password changes/resets, as well as deletion of accounts upon termination of an the employee from the organization. Embodiments are configured to create accounts on all applications in the organization that the user needs to the job identified in the user's profile. For example, these applications may be Oracle Financials, SAP, billing systems and the like. Interfaces are built to the applications, rather than having the applications build the interfaces, which is much more efficient. As illustrated in FIGS. 2 and 3 discussed above, all modules of embodiments discussed herein may be automated or some human involvement may be required.

Figure 5:
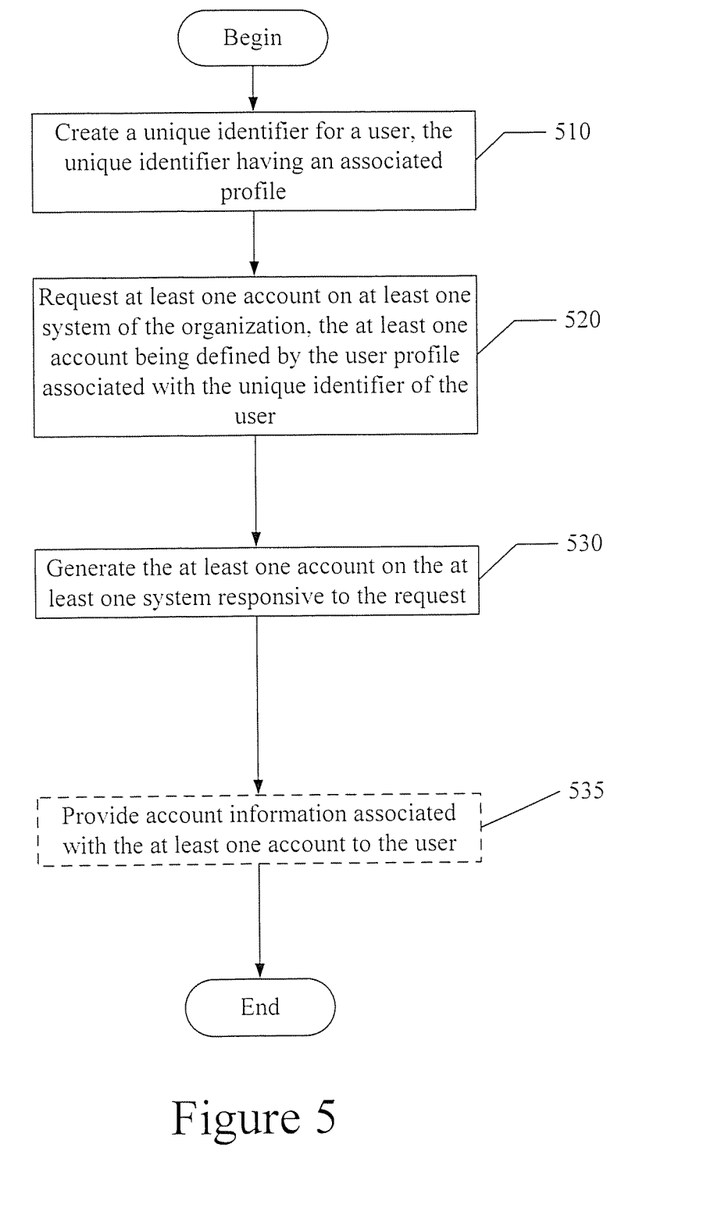
FIGS. 5 through 8 are flowcharts illustrating operations according to various embodiments.

Operations in accordance with various embodiments will now be discussed with respect to FIGS. 5 through 8. Blocks shown in dotted lines indicate optional steps. Referring first to FIG. 5, operations for managing access to systems of an organization begin at block 510 by creating a unique identifier for a user. When a new user is added to the system a unique identifier is created for the user along with an associated user profile. The user profile may include the user's name, address, phone number, department/organization of employment etc. In some embodiments, the unique identifier may be an AT&T UID. The unique identifier may be stored in an identifier repository associated with the organization. This repository may be a single repository or multiple repositories without departing from the scope of embodiments discussed herein and may store every unique identifier associated with every user of the systems of the organization.

Once the unique identifier is created, one or more accounts may be requested for the user for applications the user needs to perform the tasks associated with their employment (block 520). The accounts requested may be defined based on information found in the user profile of the user associated with the unique identifier. For example, if the user profile indicates that the user is employed in accounting, the status of accounting may trigger certain accounts on certain applications to be requested. Responsive to the requests, the one or more accounts may be generated for the user on the systems of the organization (block 530).

In some embodiments, once the accounts are generated, the account information associated with the one or more accounts generated are sent to the user so as to allow the user to access the systems/applications associated with the at least one account (block 535). For example, the user may be provided with usernames and passwords for all of the generated accounts. These passwords can be changed as discussed above.

Figure 6:
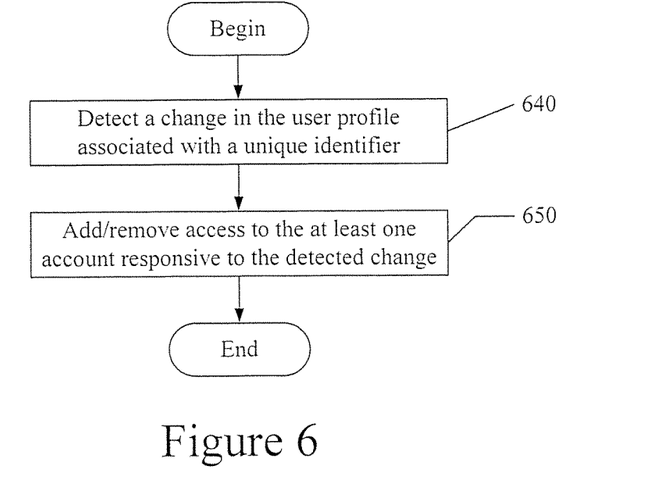

Referring now to FIG. 6, operations for changing user access to systems will be discussed. Operations begin at block 640 by detecting a change in the user profile. This change may be detected by the UPR server 207 when processing nightly feeds as discussed above with respect to FIG. 2. For example, the user may have been promoted or changed positions within the organization. Responsive to the detected change, access to one or more accounts on the system of the organization may be added, removed or both. For example, if the user is promoted they may need access to systems they did not have access to before and no longer need access to systems they previously had access to.

Figure 7:
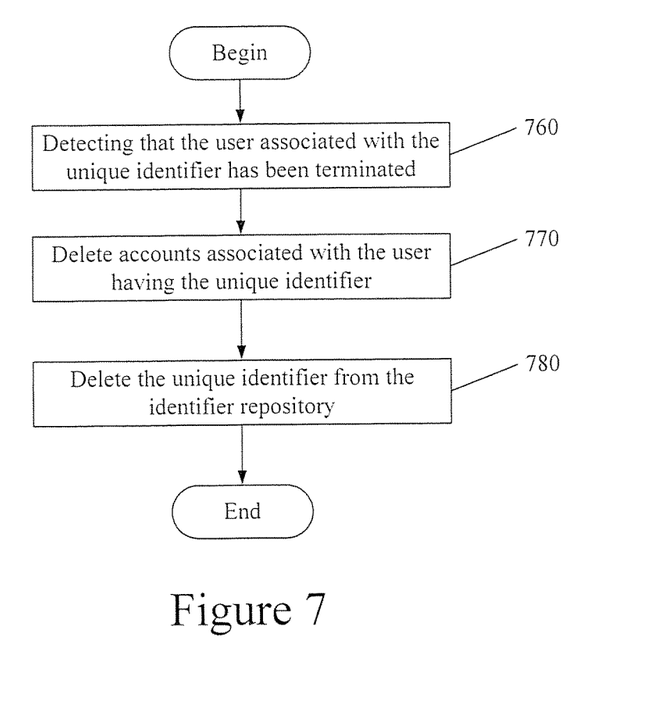

Referring now to FIG. 7, operations for removing a user from the systems will be discussed. Operations begin at block 760 by detecting termination of the user. When termination is detected, all of the accounts associated with the unique identifier of the user are deleted (block 770) and the unique identifier associated with the user is removed from the identifier repository (block 780).

Figure 8:
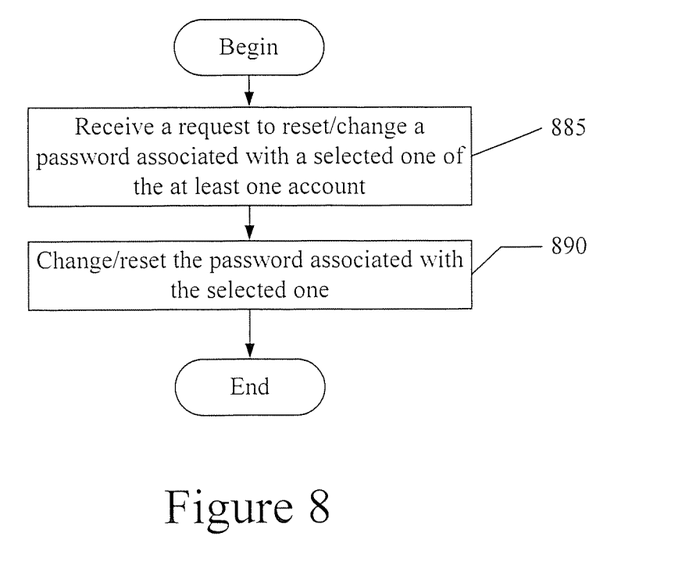

Referring now to FIG. 8, operations for requesting a change/reset of a password will be discussed. Operations begin at block 885 by receiving a request to change and/or reset a password associated with a selected account for a system. Once the user is authorized, the password associated with the selected account may be changed or reset (block 890).

It will be understood that the operations in accordance with some embodiments discussed with respect to FIGS. 5 through 8 may be fully automated or require some human involvement without departing from the scope of embodiments discussed herein.

The flowcharts of FIGS. 5-8 illustrate the architecture, functionality, and operations of embodiments of methods, systems, and/or computer program products for tracking information on the Internet. In this regard, each block represents a module, segment, or portion of code, which comprises one or more executable instructions for implementing the specified logical function(s). It should also be noted that in other implementations, the function(s) noted in the blocks may occur out of the order noted in FIGS. 5-8. For example, two blocks shown in succession may, in fact, be executed substantially concurrently or the blocks may sometimes be executed in the reverse order, depending on the functionality involved.

Many variations and modifications can be made to the embodiments without substantially departing from the principles of the present invention. All such variations and modifications are intended to be included herein within the scope of the present invention, as set forth in the following claims.

That which is claimed:

1. A method of managing access to systems of an organization, comprising:
   receiving, by a server, selections associated with a user, the selections input to an account requestor module website, the selections specifying an organization, a department, and a login form;
   receiving, by the server, a unique identifier input by the user in the account requestor module website;
   storing, by the server, an electronic profile in electronic association with the unique identifier input by the user in the account requestor module website;
   querying, by the server, an electronic repository for the department input in the account requestor module website, the electronic repository electronically associating software applications and departments including the department;
   identifying, by the server, a listing of software applications that is electronically associated with the department;
   requesting, by the server, an account for each software application in the listing of software applications, wherein the account for the each software application in the listing of software applications is defined based on information in the electronic profile associated to the department; and
   generating the account for the each software application in the listing of software applications responsive to the requesting of the account.

2. The method of claim 1, further comprising:
   detecting a change in the electronic profile; and
   modifying access to the account responsive to the change.

3. The method of claim 2, wherein detecting the change in the electronic profile comprises detecting a termination associated with the unique identifier and wherein the method further comprises:
   deleting the account for the each software application in the listing of software applications responsive to the termination; and
   removing the unique identifier.

4. The method of claim 1, further comprising receiving a common username and password for the each software application in the listing of software applications.

5. The method of claim 1, further comprising:
receiving a request to modify a password associated with the account of the user; and
modifying the password for the each software application in the listing of software applications.

6. The method of claim 1, further comprising associating a telephone number to the department selected by the user in the account requestor module website.

7. A system, comprising:
a hardware processor; and
a memory device, the memory device storing instructions, the instructions when executed causing the hardware processor to perform operations, the operations comprising:
receiving selections associated with a user, the selections input to an account requestor module website, the selections specifying an organization, a department, and a login form;
receiving a unique identifier input by the user in the account requestor module website;
connecting an account generation module to the account requestor module web site via a library;
querying an electronic repository for the department selected by the user in the account requestor module website, the electronic repository electronically associating software applications and departments including the department associated with the electronic profile;
retrieving a listing of software applications that is electronically associated with the department selected by the user in the account requestor module website;
requesting an account for each software application in the listing of software applications; and
generating the account for the each software application in the listing of software applications.

8. The system of claim 7, wherein the operations further comprise:
receiving a termination of employment associated with the unique identifier;
deleting the account for each software application in the listing of software applications responsive to the termination; and
removing the unique identifier.

9. The system of claim 7, wherein the operations further comprise receiving a common username and password for the each software application in the listing of software applications.

10. The system of claim 7, wherein the operations further comprise:
receiving a request to modify a password associated with the account; and
modifying the password for the each software application in the listing of software applications.

11. The system of claim 7, wherein the operations further comprise associating a telephone number to the department selected by the user in the account requestor module website.

12. A memory device storing code that when executed causes a hardware processor to perform operations, the operations comprising:
receiving selections associated with a user, the selections input to an account requestor module website, the selections specifying an organization, a department, and a login form;
receiving a unique identifier input by the user in the account requestor module website;
connecting an account generation module to the account requestor module web site via a library;
querying an electronic repository for the department selected by the user in the account requestor module website, the electronic repository electronically associating software applications and departments including the department associated with the electronic profile;
retrieving a listing of software applications that is electronically associated with the department selected by the user in the account requestor module website;
requesting an account for each software application in the listing of software applications;
generating the account for the each software application in the listing of software applications;
determining a supervisory change based on a supervisory identifier;
forcing an access review via the account requestor module web site in response to the supervisory change based on the supervisory identifier.

13. The memory device of claim 12, wherein the operations further comprise:
detecting a termination of employment associated with the unique identifier;
deleting the account for each software application in the listing of software applications responsive to the termination; and
removing the unique identifier.

14. The memory device of claim 12, wherein the operations further comprise receiving a common username and password for the each software application in the listing of software applications.

15. The memory device of claim 12, wherein the operations further comprise:
receiving a request to modify a password associated with the account; and
modifying the password for the each software application in the listing of software applications.

16. The memory device of claim 12, wherein the operations further comprise associating a telephone number to the department within the organization selected by the user in the account requestor module website.

* * * * *